United States Patent [19]
Kohlheb et al.

[11] Patent Number: 5,126,045
[45] Date of Patent: Jun. 30, 1992

[54] SUPPORT PLATES WITH MEANDRICAL CHANNELS FOR DIAPHRAGM FILTRATION

[76] Inventors: Robert Kohlheb; Martin Dosoudil, both of Kwakelkade 28, Alkmaar, Netherlands

[21] Appl. No.: 597,380

[22] Filed: Oct. 15, 1990

[30] Foreign Application Priority Data

Oct. 16, 1989 [NL] Netherlands ............... 8902565

[51] Int. Cl.⁵ .............................. B01D 61/28
[52] U.S. Cl. ................. 210/321.85; 210/489; 210/500.21; 55/158
[58] Field of Search ............ 210/321.84, 321.85, 210/321.75, 459, 346, 456, 486, 321.76, 335, 336, 338, 489, 500.21; 55/158

[56] References Cited

U.S. PATENT DOCUMENTS

| | | | |
|---|---|---|---|
| Re. 23,089 | 3/1986 | Blatt et al. | 210/651 |
| Re. 24,736 | 11/1959 | Isreeli | 210/321.76 |
| 3,352,422 | 11/1967 | Heden | 210/321.76 |
| 3,456,805 | 7/1969 | Jarius et al. | 210/321.85 |
| 3,900,398 | 8/1975 | Gillette | 210/321.85 |
| 4,411,792 | 10/1983 | Babb | 210/321.85 |
| 4,861,476 | 8/1989 | Kohlheb et al. | 210/321.76 |
| 4,944,877 | 7/1990 | Maples | 210/321.76 |

FOREIGN PATENT DOCUMENTS

| | | | |
|---|---|---|---|
| 3507532 | 9/1986 | Fed. Rep. of Germany | 210/321.76 |
| 2-095421 | 4/1990 | Japan | 210/321.85 |

Primary Examiner—Robert A. Dawson
Assistant Examiner—Wanda L. Millard
Attorney, Agent, or Firm—Pollock, Vande Sande & Priddy

[57] ABSTRACT

An apparatus for diaphragm filtration is provided with at least one disc-shaped supporting plate having a channel arranged at least on one side thereof. The channel is connected to an inlet port and an outlet port which preferably are arranged diametrically opposite each other at the periphery of the supporting plate, while over the channel a diaphragm is applied which is supported by a permeable layer onto a further supporting plate and which closes off the space taken in by the permeable layer and which space is connected to a filtrate discharge.

11 Claims, 2 Drawing Sheets

SUPPORT PLATES WITH MEANDRICAL CHANNELS FOR DIAPHRAGM FILTRATION

BACKGROUND OF THE INVENTION

The present invention relates to an apparatus for diaphragm filtration.

Diaphragm filtration is well known. The use of diaphragm filtration in the prior art has so far been limited to laboratory use for scientific purposes.

The present invention aims to provide an apparatus for diaphragm filtration which is more suitable for use in the industrial field.

The apparatus for diaphragm filtration according to the present invention comprises at least one disc-shaped supporting plate, in which at least at one side, at least one channel is provided. The channel is connected to an outlet and inlet port, preferably arranged diametrically opposite each other at the periphery of the supporting plate. A diaphragm is applied over the channel and supported through a permeable layer, such as a supporting gauze, by a further supporting plate, which is clamped onto the first supporting plate, and which closes off the space taken in by the permeable layer and which space is connected to a filtrate discharge.

In the present invention, the channel is meandrically-shaped in order to obtain a good mixture of the medium to be filtered in the channel.

Also the negative effects of the centrifugal forces on the medium to be filtered are eliminated largely due to the meandrical shape of the channel.

In a further embodiment of the apparatus according to the present invention, two or more meandrically-shaped channels, extending next to each other, are present on a flat side of the supporting plate.

In a still further embodiment of the apparatus which is particularly useful for industrial purposes, a stack of supporting plates is provided, clamped onto each other. The inner plates of the stack are provided at both sides with channels, while between every two succeeding supporting plates a permeable layer is arranged with a diaphragm on both sides thereof, such that the diaphragm adjoins a supporting plate.

In this embodiment, the channels are connected at a supporting plate to a common feed and discharge, radially extending through the thickness of the supporting plate, each being connected to a collecting- and distributing pipe, extending along the stack.

According to another embodiment of the apparatus according to the invention, both of the outer plates of the stack of supporting plates are provided on one side with a channel.

The apparatus according to the invention may be comprised of different materials.

In one preferable embodiment of the apparatus according to the invention, the supporting plates are made of plastic and the stack of supporting plates is enclosed by a metal housing, and more particularly by a steel housing.

The construction of the supporting plates may differ. Thus, it is possible, for example, that the supporting plate is made of one piece.

However, in one preferred embodiment of the inventive apparatus, a supporting plate comprises two discs, which on one flat side are provided with a channel and have their opposite sides which face one another positioned against one another. The disc are enclosed by a supporting ring with feed- and discharge channels.

One preferred embodiment of the present invention will be further described in the following detailed description with reference to the accompanying drawing wherein:

Figure 1:
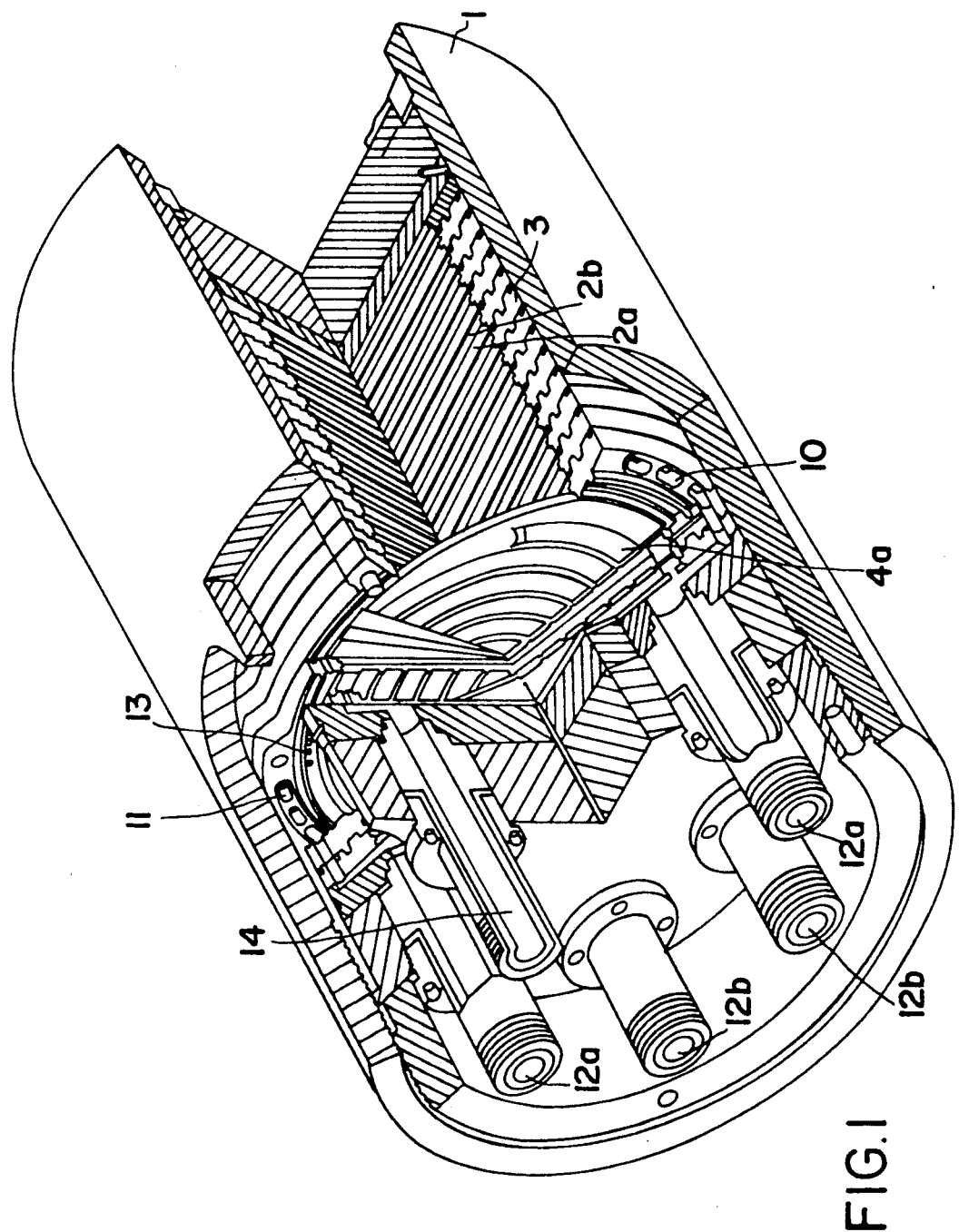
FIG. 1 is a perspective view of the apparatus according to the present invention.

As shown in the drawing, the apparatus is provided with a steel housing 1 in which a set of supporting plates is positioned, each supporting plate comprising two discs 2a and 2b, which have their flat sides arranged back to back towards one another and which are enclosed by a supporting ring 3.

On their sides which are turned away from one another, both discs 2a and 2b are provided with two meandrically-shaped channels 4a and 4b, extending next to each other, and over which a diaphragm 5, is applied and a supporting gauze 6 is arranged onto the diagram 5.

Figure 2:
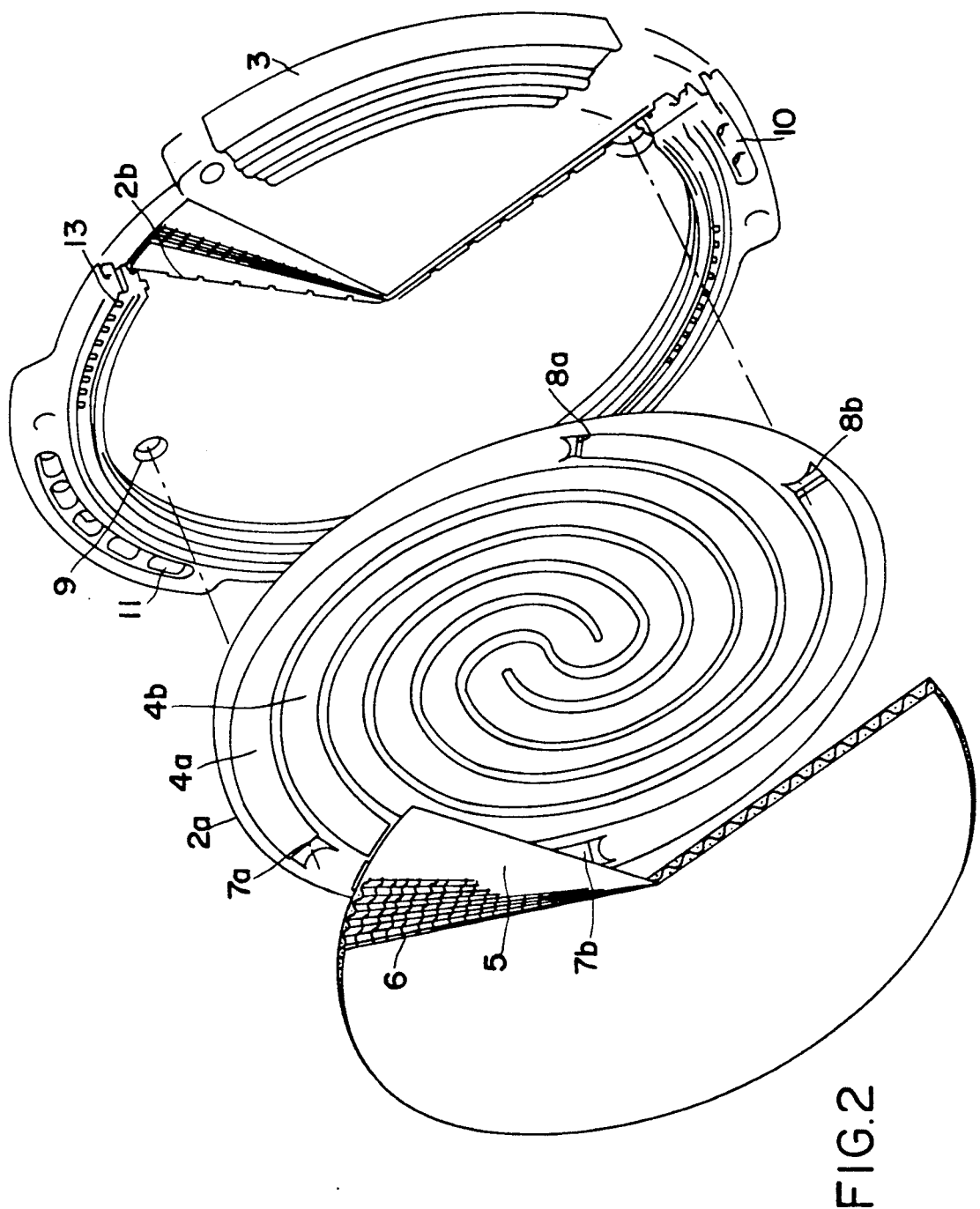
FIG. 2 is an enlarged view of a supporting plate with diaphragm and supporting gauze.

As shown in FIG. 2 the channel 4a is provided with inlet 7a and an outlet 8a and the channel 4b is provided with an inlet 7b and an outlet 8b.

Both matching inlets and outlets on either sides of the supporting plate connect to each other, as shown in FIG. 2 at 9, and subsequently extend radially and through the thickness of the composed supporting plate towards the supporting ring 3, to connect at this point to the axially extending collecting pipes 10 and distributing pipes 11, which for the one group of flow-through channels 4a extend towards the connecting stubs 12a, and for the other group of channels 4b extend towards the connecting stubs 12b.

The spaces taken in by the supporting gauze 6, in which the filtrate is collected, are connected to discharge channels 14, which are arranged within the supporting rings, and extend towards the connecting stub 14.

By connecting the various connecting stubs to each other, both groups of flow-through channels 4a and 4b may be connected with each other in parallel or in series.

Thus, by connecting to each other both connecting stubs for discharge of, and both the connecting stubs for the feed into both flow-through channels 4a and 4b, these may in a simple way be connected parallel, and by connecting to each other of the discharge connecting stub of the one group of channels 4a to the feed connecting stub of the other group 4b, both the flow-through channel groups may be connected in series.

We claim:

1. An apparatus for diaphragm filtration, comprising at least one disc-shaped supporting plate, at least two meandrically-shaped flow-through channels extending next to each other and arranged on one side of said supporting plate, each channel being connected to inlet and outlet ports which are arranged substantially diametrically opposite each other at the periphery of said supporting plate, a diaphragm applied over said channels, which is supported through a permeable layer by a second supporting plate, said second supporting plate being connected onto said first supporting plate and closing off the space taken in by the permeable layer, said space being connected to a filtrate discharge.

2. An apparatus according to claim 1, further including a stack of supporting plates clamped onto each other, wherein the inner plates of said stack are provided on either sides thereof with channels, and wherein between every two succeeding supporting plates an additional permeable layer with an additional diaphragm on either side thereof is provided.

3. An apparatus according to claim 2, wherein said channels are connected at each supporting plate to a common feed and discharge, extending radially throughout the thickness of said supporting plate, and being connected to a collecting and distributing pipe, extending in the lengthwise direction of said stack.

4. An apparatus according to claim 3, wherein the outer plates of said stack of supporting plates are also provided with a channel on one side thereof.

5. An apparatus according to claim 4, wherein said supporting plates are made of plastic and said stack of supporting plates is enclosed by a metal housing.

6. An apparatus according to claim 1, wherein said supporting plate is comprised of two discs, which on one flat side are provided with a channel, with the other flat side being positioned against each other, and wherein said discs are enclosed by a supporting ring provided with feed and discharge channels.

7. An apparatus for diaphragm filtration, comprising: a stack of disc-shaped supporting plates clamped onto each other, each inner plate in said stack being provided with at least one meandrically-shaped channel provided at least on one side thereof, said channel being connected to an inlet and an outlet ports which are arranged substantially diametrically opposite each other at the periphery of said supporting plate, a diaphragm applied over said channel, a permeable layer supporting said diaphragm on either side thereof and positioned between two succeeding supporting plates, which are clamped onto each other in said stack and close off the space taken by the permeable layer, said space being connected to a filtrate discharge.

8. An apparatus according to claim 7, wherein each channel is connected at each supporting plate to a common feed and discharge, extending radially throughout the thickness of said supporting plate, and being connected to a collecting and distributing pipe, extending in the lengthwise direction of said stack.

9. An apparatus according to claim 8, wherein the outer plates of said stack of supporting plates are also provided with a channel on one side thereof.

10. An apparatus according to claim 9, wherein said supporting plates are made of plastic and said stack of supporting plates is enclosed by a metal housing.

11. An apparatus according to claim 7, wherein each said supporting plate is comprised of two discs, which on one flat side are provided with said channel, with the other flat side being positioned against each other, and wherein said discs are enclosed by a supporting ring provided with feed and discharge channels.

* * * * *